United States Patent
Tsai

(10) Patent No.: US 7,490,252 B2
(45) Date of Patent: Feb. 10, 2009

(54) ABNORMAL POWER INTERRUPTION INTERNAL CIRCUITRY PROTECTION METHOD AND SYSTEM FOR COMPUTER PLATFORM

(75) Inventor: Sheng-Yuan Tsai, Taipei (TW)

(73) Assignee: Inventec Corporation (TW)

( * ) Notice: Subject to any disclaimer, the term of this patent is extended or adjusted under 35 U.S.C. 154(b) by 510 days.

(21) Appl. No.: 11/378,590

(22) Filed: Mar. 17, 2006

(65) Prior Publication Data

US 2007/0220284 A1 Sep. 20, 2007

(51) Int. Cl.
*G06F 1/00* (2006.01)
*G06F 1/26* (2006.01)
*G06F 1/32* (2006.01)
*G06F 11/00* (2006.01)

(52) U.S. Cl. .................. 713/300; 713/320; 713/323; 713/324; 713/330; 714/14; 714/15; 714/22; 714/24

(58) Field of Classification Search .................. 713/300
See application file for complete search history.

(56) References Cited

U.S. PATENT DOCUMENTS

| 5,151,907 A * | 9/1992 | Robbins ...................... 714/22 |
| 5,463,663 A * | 10/1995 | Maruyama et al. ........... 375/356 |
| 6,178,515 B1 * | 1/2001 | Hayashi et al. ............. 713/300 |

* cited by examiner

*Primary Examiner*—Thuan N Du
*Assistant Examiner*—Michael J Brown
(74) *Attorney, Agent, or Firm*—Peter F. Corless; Steven M. Jensen; Edwards Angell Palmer & Dodge LLP

(57) ABSTRACT

An abnormal power interruption internal circuitry protection method and system is proposed for use with a computer platform, such as a blade server, which is characterized by the utilization of each server module's identification code (i.e., blade ID signal) and power-good signal to judge whether each server module is subjected to an abnormal power interruption, such that in the event of the abnormal power interruption, a small amount of remnant electrical power left in the internal circuitry of the blade server can be fetched as power source to shut down the server modules through a normal shutdown procedure. This feature can help protect the internal circuitry of the server modules of the blade server from being damaged due to abnormal shutdown in the event of abnormal power interruption.

8 Claims, 2 Drawing Sheets

ABNORMAL POWER INTERRUPTION INTERNAL CIRCUITRY PROTECTION METHOD AND SYSTEM FOR COMPUTER PLATFORM

BACKGROUND OF THE INVENTION

1. Field of the Invention

This invention relates to computer technology, and more particularly, to an abnormal power interruption internal circuitry protection method and system which is designed for use in conjunction with a computer platform, such as a blade server, for protecting the internal circuitry of the blade server in the event of an abnormal power interruption to the blade server, such as when the user inadvertently unplugs an actively operating server module from the blade server's chassis or when the blade server's main power supply fails unexpectedly, so as to thereby protect the internal circuitry of each of the server modules of the blade server from being damaged due to electrical surges from the abnormal power interruption.

2. Description of Related Art

A blade server is a clustering type of network server that is characterized by the use of a chassis to integrate a cluster of the circuit boards of independent server modules (commonly called "blades"), with all of these server modules providing the same server functionality. In other words, a blade server can respond to a client's request by linking any one of the clustered server modules to the client. In practical implementation, each server module is made into a single circuit board (i.e., blade), which can be easily fitted to the blade server's enclosure to increase the blade server's client serving capacity.

In actual application, since each server module is functionally coupled to the blade server by plugging it to the blade server's chassis, it would be likely that the network management personnel could inadvertently unplug an actively operating server module from the chassis. This inadvertent unplugging of the server module will cause a sudden interrupt of power supply to the server module, thus causing damage to the internal circuitry of the inadvertently unplugged server module. Moreover, during operation of the blade server, abnormal power interruption could be resulted from various causes, such as earthquake or fire, which would also cause damage to the internal circuitry of the server modules in the blade server.

SUMMARY OF THE INVENTION

It is therefore an objective of this invention to provide an abnormal power interruption internal circuitry protection method and system for use with a blade server for protecting the internal circuitry of the server modules of the blade server in the event of an abnormal power interruption.

The abnormal power interruption internal circuitry protection method and system according to the invention is designed for use in conjunction with a computer platform, such as a blade server, for protecting the internal circuitry of the blade server in the event of an abnormal power interruption to the blade server, such as when the user inadvertently unplugs an actively operating server module from the blade server's chassis or when the blade server's main power supply fails unexpectedly, so as to thereby protect the internal circuitry of each of the server modules of the blade server from being damaged due to electrical surges from the abnormal power interruption.

The abnormal power interruption internal circuitry protection method according to the invention comprises: (1) in the event that each of the processing units is being plugged to the computer platform, registering an identification code of each of the processing units; (2) setting an active status flag associated with each of the processing units to true value if the associated one of the processing units is set to active operating status, and otherwise setting the active status flag to false value if the associated one of the processing units is set to inactive status; (3) in the event of a change to the registered identification code, issuing a backup power shutdown enable message under the condition that the active status flag is currently set to false value; and otherwise, issuing a main-and-backup power shutdown enable message under the condition that the active status flag is currently set to true value; and (4) in the event of an abnormal power interruption to the computer platform, fetching a remnant amount of electrical power left in the computer platform to respond to the main-and-backup power shutdown enable message by successively performing a main power shutdown procedure and a backup power shutdown procedure to shut down both the main power and the backup power of each of the processing units, and otherwise respond to the backup power shutdown enable message by performing a backup power shutdown procedure to shut down the backup power of each of the processing units.

In architecture, the abnormal power interruption internal circuitry protection system is based on a modularized component model which comprises: (A) an identification code registering module, which is capable of registering an identification code of each of the multiple processing units while being plugged to the computer platform; (B) an active status setting module, which includes an active status flag for each of the multiple processing units plugged to the computer platform, and which is capable of setting the active status flag of the associated one of the processing units to true value if the associated one of the processing units is set to active operating status, and otherwise capable of setting the active status flag to false value if the associated one of the processing units is set to inactive status; (C) an identification code change responding module, which is capable of being activated in an event of a change to the identification code registered by the identification code registering module, and when activated, capable of issuing a backup power shutdown enable message under the condition that the active status flag is currently set to false value; and otherwise, capable of issuing a main-and-backup power shutdown enable message under the condition that the active status flag is currently set to true value; and (D) a shutdown control module, which is capable of being powered by a remnant amount of electrical power left in the computer platform after the abnormal power interruption occurs, and which is capable of responding to the main-and-backup power shutdown enable message from the identification code change responding module by successively performing a main power shutdown procedure and a backup power shutdown procedure to shut down both the main power and the backup power of each of the multiple processing units, and otherwise capable of responding to the backup power shutdown enable message from the identification code change responding module by performing a backup power shutdown procedure to shut down the backup power of each of the multiple processing units.

The abnormal power interruption internal circuitry protection method and system for computer platform according to the invention is characterized by the utilization of each server module's identification code (i.e., blade ID signal) and power-good signal to judge whether each server module is subjected to an abnormal power interruption, such that in the event of the abnormal power interruption, a small amount of remnant electrical power left in the internal circuitry of the blade server can be fetched as power source to shut down the server modules through a normal shutdown procedure. This feature can help protect the internal circuitry of the server modules of the blade server from being damaged due to abnormal shutdown in the event of abnormal power interruption.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The abnormal power interruption internal circuitry protection method and system for computer platform according to the invention is disclosed in full details by way of preferred embodiments in the following with reference to the accompanying drawings.

Figure 1:
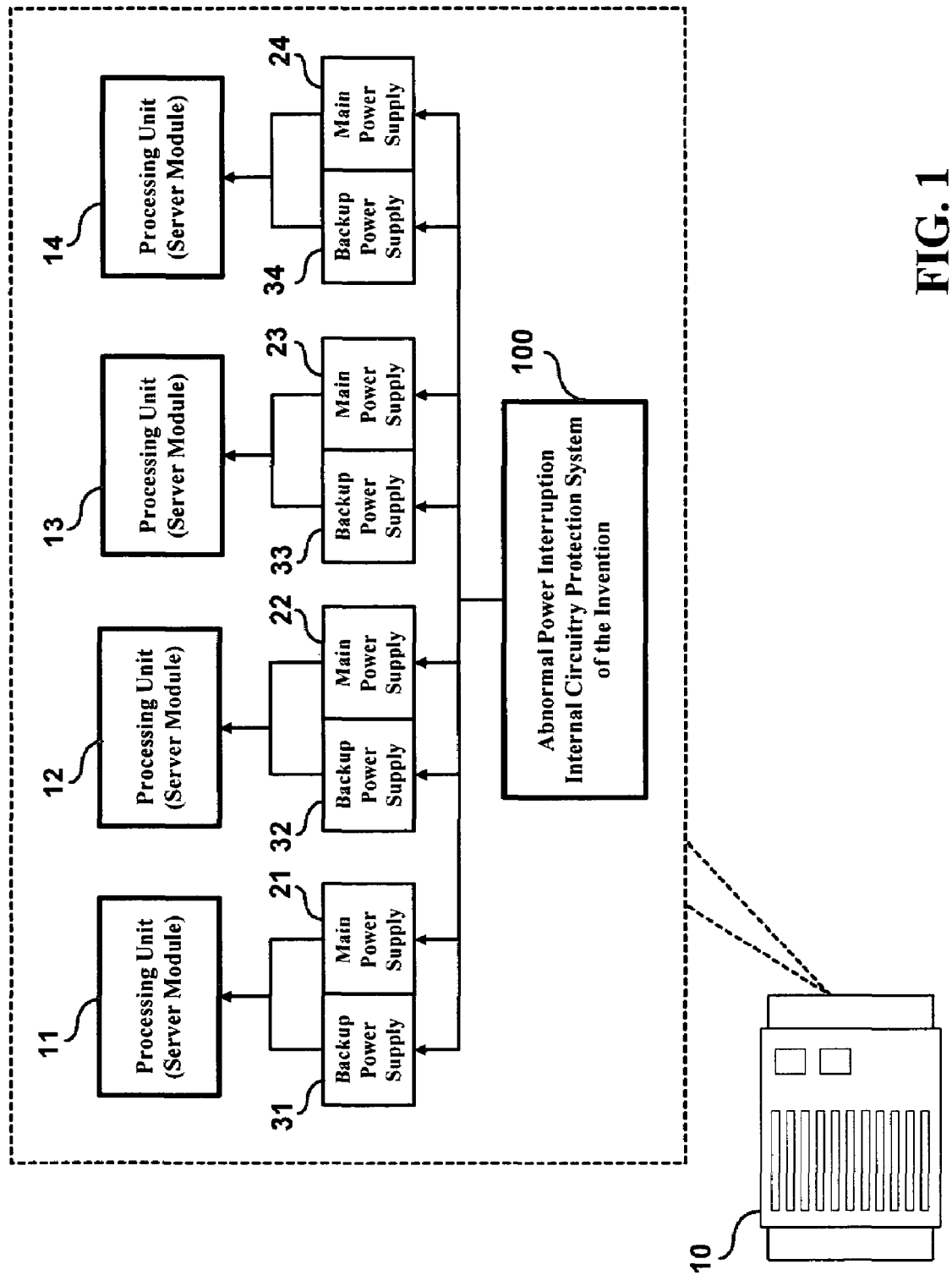
FIG. 1 is a schematic diagram showing the application of the abnormal power interruption internal circuitry protection system of the invention in conjunction with a blade server.

FIG. 1 is a schematic diagram showing the application of the abnormal power interruption internal circuitry protection system of the invention 100 in conjunction with a computer platform, such as a blade server 10. As shown, the blade server 10 is equipped with a number of independent processing units that are used as server modules 11, 12, 13, 14 (note that FIG. 1 demonstratively shows only 4 server modules 11, 12, 13, 14; but in practice, the number of server modules is unrestricted).

In operation, the abnormal power interruption internal circuitry protection system of the invention 100 is capable of providing the server modules 11, 12, 13, 14 with an abnormal power interruption internal circuitry protection function that can respond to an event of an abnormal power interruption to the blade server 10, such as when the network management personnel inadvertently unplugs an actively operating server module (11, 12, 13, or 14) from the chassis of the blade server 10 or when the main power supply of the blade server 10 fails suddenly. When activated, the abnormal power interruption internal circuitry protection system of the invention 100 is capable of performing a normal shut-down procedure to successively shut down the respective main power supplies 21, 22, 23, 24 and backup power supplies 31, 32, 33, 34 of the server modules 11, 12, 13, 14 to thereby protect the internal circuitry (not shown in drawing) of the server modules 11, 12, 13, 14 from being damaged due to electrical surges from the abnormal power interruption.

Figure 2:
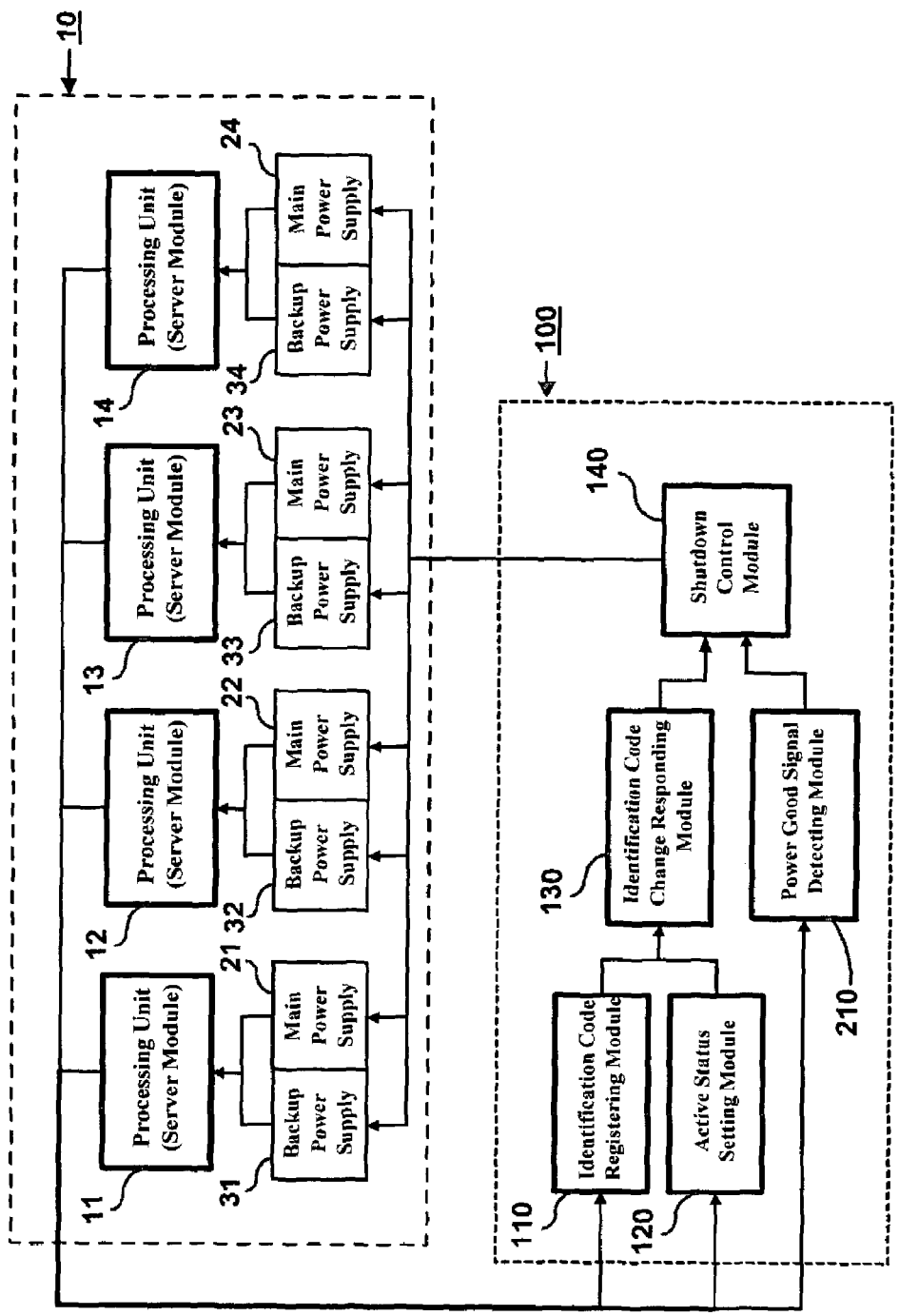
FIG. 2 is a schematic diagram showing the modularized component model of the abnormal power interruption internal circuitry protection system of the invention.

As shown in FIG. 2, in architecture, the abnormal power interruption internal circuitry protection system of the invention 100 is based on a modularized component model which comprises: (A) an identification code registering module 110; (B) an active status setting module 120; (C) an identification code change responding module 130; and (D) a shutdown control module 140; and can further optionally comprise a power good signal detecting module 210. Firstly, the respective attributes and behaviors of the constituent components 110, 120, 130, 140, 210 of the abnormal power interruption internal circuitry protection system of the invention 100 are described in details in the following.

The identification code registering module 110 is capable of registering an identification code of each of the server modules 11, 12, 13, 14 in the blade server 10 when each of the server modules 11, 12, 13, 14 are plugged to the blade server 10. The identification code is factory-stored in each of the server modules 11, 12, 13, 14 (herein denoted by Blade_ID).

The active status setting module 120 includes an active status flag PowerOn_Flag for each of the server modules 11, 12, 13, 14, where the active status flag PowerOn_Flag is used to indicate whether the associated one of the server modules 11, 12, 13, 14 is in active operating status after power-on. In operation, the active status setting module 120 is capable of setting the active status flag PowerOn_Flag to TRUE value (such as logic value "1") if the associated one of the server modules 11, 12, 13, 14 is set to active operation after power-on; and otherwise capable of setting the active status flag PowerOn_Flag to FALSE value (such as logic value "0") when if the associated one of the server modules 11, 12, 13, 14 is in inactive status.

The identification code change responding module 130 is capable of being activated in response to an event of a change to the identification code Blade_ID of the server modules 11, 12, 13, 14 registered by the identification code registering module 110, where the change to the identification code Blade_ID is caused by an abnormal power interruption to the blade server 10 that causes the registered data of the identification code Blade_ID to be abruptly changed due to a sudden loss of electrical power. When activated, the identification code change responding module 130 is capable of issuing a backup power shutdown enable message to the shutdown control module 140 under the condition that the active status flag PowerOn_Flag is currently set to FALSE value ("0"); and otherwise, capable of issuing a main-and-backup power shutdown enable message to the shutdown control module 140 under the condition that the active status flag PowerOn_Flag is currently set to TRUE value ("1").

The shutdown control module 140 is capable of being activated in response to an event of abnormal power interruption to the blade server 10, and after the abnormal power interruption occurs, is capable of remaining operable for a short while by fetching a remnant amount of electrical power left in the internal circuitry of the blade server 10. When activated to operate, the shutdown control module 140 is capable of responding to the main-and-backup power shutdown enable message from the identification code change responding module 130 by successively performing a main power shutdown procedure and a backup power shutdown procedure to shut down all the main power supplies 21, 22, 23, 24 and the backup power supplies 31, 32, 33, 34 of the server modules 11, 12, 13, 14, and otherwise capable of responding to the backup power shutdown enable message from the identification code change responding module 130 by performing a backup power shutdown procedure to shut down all the backup power supplies 31, 32, 33, 34 of the server modules 11, 12, 13, 14 in the blade server 10.

The power good signal detecting module 210 is an optional component, which is capable of being activated in response to an event of the plugging of the server modules 11, 12, 13, 14 to the blade server 10 by detecting whether the server modules 11, 12, 13, 14 issue a power-good signal, such as a 12-volt PGD (Power Good) signal in standard blade server architecture. If YES, the power good signal detecting module 210 will issue no main-and-backup power shutdown enable message; and whereas if NO, the power good signal detecting module 210 will issue a main-and-backup power shutdown enable message to the shutdown control module 140 to thereby activate the shutdown control module 140 to perform a main power shutdown procedure and a backup power shutdown procedure.

The following is a detailed description of a practical application example of the abnormal power interruption internal circuitry protection system of the invention 100 during actual operation.

Referring to FIG. 1 together with FIG. 2, in actual operation, when the network management personnel plugs each of the server modules 11, 12, 13, 14 to the blade server 10, it will first activate the identification code registering module 110 in the abnormal power interruption internal circuitry protection system of the invention 100 to respond by registering an identification code Blade_ID of each of the server modules 11, 12, 13, 14. If the network management personnel chooses to put the server modules 11, 12, 13, 14 in inactive status after being plugged in position in the blade server 10, it will cause the active status setting module 120 to respond by setting the active status flag PowerOn_Flag to FALSE value (i.e., "0"). If the active status flag PowerOn_Flag is initially set to FALSE value by default, then this setting action is unnecessary. On the contrary, if the network management personnel chooses to set the server modules 11, 12, 13, 14 to active operating status, then it will cause the active status setting module 120 to respond by setting the active status flag PowerOn_Flag to TRUE value (i.e., "1").

During routine operation of the blade server 10, if an abnormal power interruption occurs due to, for instance, earthquake or fire, then the identification code Blade_ID of each of the server modules 11, 12, 13, 14 registered by the identification code registering module 110 will be subjected to an abrupt change due to sudden loss of electrical power. This condition immediately causes the identification code change responding module 130 to respond in either of two different ways depending on the current value of the active status flag PowerOn_Flag; i.e., if the active status flag PowerOn_Flag is currently set to FALSE value ("0"), the identification code change responding module 130 will issue a backup power shutdown enable message to the shutdown control module 140; and otherwise if the active status flag PowerOn_Flag is currently set to TRUE value ("1"), the identification code change responding module 130 will issue a main-and-backup power shutdown enable message to the shutdown control module 140. After the occurrence of the abnormal power interruption, the shutdown control module 140 is notwithstanding able to remain operable for a short while by fetching a remnant amount of electrical power left in the internal circuitry of the blade server 10. When activated to operate, the shutdown control module 140 operates in either of two different manners depending on the type of message issued by the identification code change responding module 130; i.e., if a main-and-backup power shutdown enable message is issued, the shutdown control module 140 will respond by successively performing a main power shutdown procedure and a backup power shutdown procedure to shut down all the main power supplies 21, 22, 23, 24 and the backup power supplies 31, 32, 33, 34 of the server modules 11, 12, 13, 14; and on the other hand, if a backup power shutdown enable message is issued, the shutdown control module 140 will respond by performing a backup power shutdown procedure to shut down all the backup power supplies 31, 32, 33, 34 of the server modules 11, 12, 13, 14.

In addition, the abnormal power interruption internal circuitry protection system of the invention 100 can optionally include a power good signal detecting module 210, which is capable of being activated in response to an event of the plugging of the server modules 11, 12, 13, 14 to the blade server 10 by detecting whether the server modules 11, 12, 13, 14 issue a power-good signal, such as a 12-volt PGD (Power Good) signal in standard blade server architecture. If YES, the power good signal detecting module 210 will issue no main-and-backup power shutdown enable message; and whereas if NO, the power good signal detecting module 210 will issue a main-and-backup power shutdown enable message to the shutdown control module 140 to thereby activate the shutdown control module 140 to perform a main power shutdown procedure and a backup power shutdown procedure.

In conclusion, the invention provides an abnormal power interruption internal circuitry protection method and system for use with a computer platform, such as a blade server, for providing the blade server with an abnormal power interruption internal circuitry protection function, which is characterized by the utilization of each server module's identification code (i.e., blade ID signal) and power-good signal to judge whether each server module is subjected to an abnormal power interruption, such that in the event of the abnormal power interruption, a small amount of remnant electrical power left in the internal circuitry of the blade server can be fetched as power source to shut down the server modules through a normal shutdown procedure. This feature can help protect the internal circuitry of the server modules of the blade server from being damaged due to abnormal shutdown in the event of abnormal power interruption. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An abnormal power interruption internal circuitry protection method for use with a computer platform of the type having a plurality of processing units for protecting the internal circuitry of each of the processing unit in the computer platform in the event of an abnormal power interruption, which comprises:

in the event that each of the processing units is being plugged to the computer platform, registering an identification code of each of the processing units;

setting an active status flag associated with each of the processing units to true value if the associated one of the processing units is set to active operating status, and otherwise setting the active status flag to false value if the associated one of the processing units is set to inactive status;

in the event of a change to the registered identification code, issuing a backup power shutdown enable message under the condition that the active status flag is currently set to false value; and otherwise, issuing a main-and-backup power shutdown enable message under the condition that the active status flag is currently set to true value; and in the event of an abnormal power interruption to the computer platform, fetching a remnant amount of electrical power left in the computer platform to respond to the main-and-backup power shutdown enable message by successively performing a main power shutdown procedure and a backup power shutdown procedure to shut down both the main power and the backup power of each of the processing units, and otherwise respond to the backup power shutdown enable message by performing a backup power shutdown procedure to shut down the backup power of each of the processing units.

2. The abnormal power interruption internal circuitry protection method of claim 1, wherein the computer platform is a blade server.

3. The abnormal power interruption internal circuitry protection method of claim 1, wherein the multiple processing units of the computer platform are each a server module circuit board.

4. The abnormal power interruption internal circuitry protection method of claim 1, wherein, in response to an event of the plugging of the processing units to the computer platform, detecting whether the processing units issue a power-good signal; and if NO, issuing a main-and-backup power shutdown enable message such that a main power shutdown procedure and a backup power shutdown procedure are performed.

5. An abnormal power interruption internal circuitry protection system for use with a computer platform of the type having a plurality of processing units for protecting the internal circuitry of each of the processing unit in the computer platform in the event of an abnormal power interruption, which comprises:

an identification code registering module, which is capable of registering an identification code of each of the multiple processing units while being plugged to the computer platform;

an active status setting module, which includes an active status flag for each of the multiple processing units plugged to the computer platform, and which is capable of setting the active status flag of the associated one of the processing units to true value if the associated one of the processing units is set to active operating status, and otherwise capable of setting the active status flag to false value if the associated one of the processing units is set to inactive status;

an identification code change responding module, which is capable of being activated in an event of a change to the identification code registered by the identification code registering module, and when activated, capable of issuing a backup power shutdown enable message under the condition that the active status flag is currently set to false value; and otherwise, capable of issuing a main-and-backup power shutdown enable message under the condition that the active status flag is currently set to true value; and a shutdown control module, which is capable of being powered by a remnant amount of electrical power left in the computer platform after the abnormal power interruption occurs, and which is capable of responding to the main-and-backup power shutdown enable message from the identification code change responding module by successively performing a main power shutdown procedure and a backup power shutdown procedure to shut down both the main power and the backup power of each of the multiple processing units, and otherwise capable of responding to the backup power shutdown enable message from the identification code change responding module by performing a backup power shutdown procedure to shut down the backup power of each of the multiple processing units.

6. The abnormal power interruption internal circuitry protection system of claim 5, wherein the computer platform is a blade server.

7. The abnormal power interruption internal circuitry protection system of claim 5, wherein the multiple processing units of the computer platform are each a server module.

8. The abnormal power interruption internal circuitry protection system of claim 5, further comprising:

a power good signal detecting module, which is capable of being activated in response to an event of the plugging of the processing units to the computer platform by detecting whether the processing units issue a power-good signal; and if NO, capable of issuing a main-and-backup power shutdown enable message to the shutdown control module to thereby activate the shutdown control module to perform a main power shutdown procedure and a backup power shutdown procedure.

* * * * *